March 3, 1964     V. R. BERG     3,123,051

TIE-STALL FOR CATTLE

Filed Feb. 28, 1961

INVENTOR.
VERNON R. BERG
BY
Wheeler, Wheeler & Wheeler
ATTORNEYS

United States Patent Office 3,123,051
Patented Mar. 3, 1964

3,123,051
TIE-STALL FOR CATTLE
Vernon R. Berg, 413 Park St., Marshfield, Wis.
Filed Feb. 28, 1961, Ser. No. 92,288
4 Claims. (Cl. 119—119)

This invention relates to a tie-stall for cattle.

Tie-stalls are stalls in which a collar usually comprising a rope, strap, or chain encircles the neck of the animal which occupies the stall and a connection is made from the collar to both of the laterally adjacent bars at the front of the stall. The arrangement permits considerable freedom of movement from front to rear and side to side as compared with stanchions of the neck clamping type. However, the slack in the connections from the collar to the bars gives rise to complications when the animal lies down. The animal may get one or both feet entangled in the chain or other flexible connectors and may be unable to rise from its lying position and may even become seriously injured due to its alarm under these circumstances.

The present invention contemplates that the forward bars of the stall be at conventional tie-stall spacings at the level at which the flexible connectors extend to such bars from the collar when the animal is standing. However, the bars are widely divergent downwardly below that level and the connectors are freely slidable upon such bars, the result being that when the animal lies down the connectors are so extended laterally as to be virtually free of slack or at least will not have sufficient slack to permit the animal's feet to become entangled.

Figure 1:
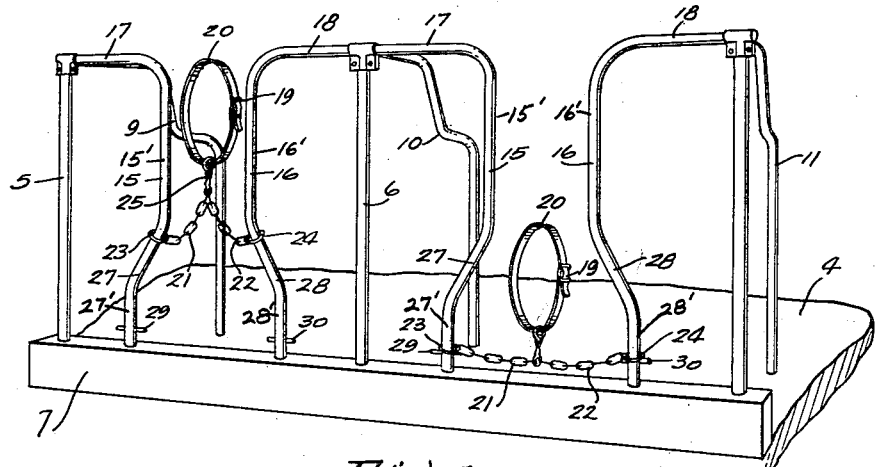
FIG. 1 is a front view in perspective showing a cow stall made in accordance with the present invention, one of the collars and its connectors being illustrated in the position assumed by the parts when the animal wearing the collars are standing; another collar and its connectors being shown in the position assumed by the parts when the animal lies down.
Figure 2:
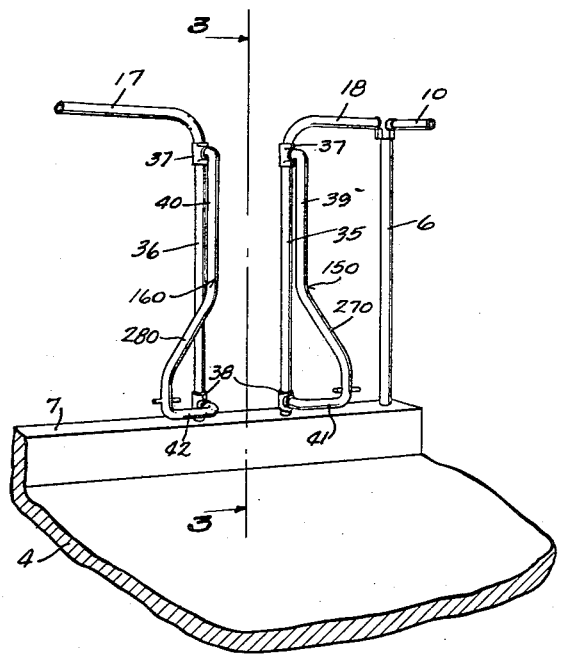
FIG. 2 is a rear view in perspective, fragmentarily showing a modified embodiment designed to permit the invention to be applied to existing stalls.

The construction shown in FIGS. 1 and 2 includes corner stall posts. The front corner stall posts 5 and 6 are fixed to the stall floor 4 by setting them in concrete curb 7 at the front of the stall. The partition bars 9, 10, and 11 are connected with these posts and extend rearwardly and downwardly, usually being anchored in the floor at the rear corners of the stalls.

The stall bars 15 and 16 are duplicated at the front of each stall and are spaced sufficiently to allow freedom of lateral movement to the animal whose neck projects between these bars. The generally horizontal top front bars 17 and 18 connect the bars 15 and 16 with the respective front corner stall posts as shown. Intermediate each pair of stalls the top front bars 17 and 18 comprise a rigid connection between the stall bar 15 of one stall and the stall bar 16 of the other, whereby the stall bars and the top bars providing the connection between them constitute, in effect, a rigid structure in the form of an inverted U with downwardly convergent leg portions. The convergent lower ends of such portions are fixed in the floor or curb of the stall. The convergence of the leg portions of each unit results in corresponding divergence of the leg portions of adjacent units at opposite sides of a given stall. The partition bars 10 may be of any desired form and may be connected in any desired manner centrally to the stall posts, with or without the post 6.

A collar 20 encircles the neck of the animal and has flexible connectors 21 and 22 attaching it to the front posts 15 and 16. In accordance with the present invention, the terminal loops 23 and 24 of the connectors 21 and 22 are slidable vertically on the stanchion bars. The connectors 21 and 22 are joined centrally and have a releasable fastener 25 connecting them with the collar 20. For the purposes of the present disclosure, but merely by way of example, the collar 20 is illustrated as a strap having a buckle 19 and the connectors happen to be lengths of chain.

In accordance with the present invention, the bars 15 and 16 have generally parallel upper portions 15' and 16', below which the bars have intermediate portions divergent downwardly. In the construction shown in FIGS. 1 and 2, it is only the intermediate portions 27, 28 of the bars 15 and 16 which are downwardly divergent. These bars may also have lower portions 27' and 28' optionally provided with cross pins 29 and 30 which limit the downward movements of the terminal links 23 and 24 at any desired level.

When the collar 20 is worn by an animal which is standing erect, the collar will be at the position shown at the left in FIG. 1, and there will be considerable slack in the flexible connectors 21, 22. When the animal lies down, the collar will be lowered toward the position shown at the right in FIG. 1. Thereupon the terminal links 23 and 24 of the flexible connectors will move downwardly and outwardly upon the divergent portions of the stanchion bars, thereby taking much of the slack from the flexible connectors 21, 22.

Thus, even if the animal throws its foot forward in lying down, in rising, or during sleep, the foot cannot readily pass over either of the connectors, and therefore cannot become entangled. Yet, when the animal rises from its prone position in the stall, the movement of the links 23 and 24 upon the stanchion bars will bring these closer together to restore considerable slack to the connectors 21, 22 with corresponding increase in freedom of movement of the animal.

In the stall shown in FIG. 2, the bars 35, 36 are parallel in accordance with conventional tie-stall practice. In order to permit the present invention to be used in conjunction with such a conventional stall I have provided some auxiliary stanchion bars at 150 and 160 having clamping fittings at 37 and 38 applicable to the existing bars 35 and 36. The auxiliary bars have their upper portions 39, 40 generally parallel to the existing bars but at 270 and 280 the auxiliary bars are divergent and at 41, 42 their lower ends are connected back to the lower fittings 38 attached to the existing front stall bars 35, 36 as above described.

Figure 3:
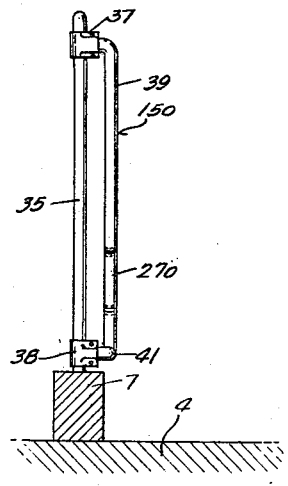
FIG. 3 is a view taken in longitudinal section on the line 3—3 of FIG. 2 and showing stall attachment in side elevation and on slightly enlarged scale.

The collar and flexible connectors are not shown in FIGS. 2 and 3 but will be understood to be of the general type illustrated in FIG. 1. The operation will be the same. Connector slack will be provided when the animal stands and the slack will be decreased or eliminated automatically when the animal lies down, this being a result of the divergence of its bar portions upon which the terminals of the flexible connectors are slidable when the collar moves downwardly.

I claim:

1. In a stall of the type in which an animal collar has normally slack flexible connectors extending from the collar to bars at each side of the collar, said connectors having terminal portions slidable vertically on such bars, the improvement which comprises the combination with the said collar and connectors, of laterally spaced bars having substantially parallel upper portions and lower portions, the upper portions being less widely spaced than the lower portions and having intermediate portions downwardly divergent from the upper portions to the lower portions of the bars, the upper portions of the bars being defined as those portions with which the terminal portions of the connectors are engaged when an animal wearing the collar is standing and such upper portions being spaced at a distance materially less than the combined length of said connectors, whereby the connectors are slack when an animal wearing the collar stands in the stall, the lower portions of the bars being defined as those portions of the bars with which the terminal portions of the connectors register when an animal wearing the collar lies in the stall, the greater spacing of such lower portions resulting in substantial reduction in the slack of the flexible connectors when an animal wearing the collar lies down in the stall.

2. The device of claim 1 in which the stall includes permanent bars in substantial parallelism at the front of the stall and the bars with the divergent portions aforesaid are separately fabricated auxiliary bars, and means for connecting the upper and lower ends of the auxiliary bars with corresponding portions of the permanent bars of the stall.

3. The device of claim 2 in which the auxiliary bars having divergent portions aforesaid, have top clamping connections with the permanent bars of the stall and extend longitudinally of the stall and thence downwardly along the permanent bars, and thence divergently from the permanent bars, and thence inwardly and longitudinally of the stall into connection with the permanent bars adjacent the lower ends of the latter.

4. In an animal stall installation including a plurality of stalls of the type in which an animal collar has normally slack flexible connectors extending from the collar to bars at each side of the collar, said connectors having terminal portions slidable vertically on such bars, the improvement which comprises the combination with the collar and connectors of the respective stalls, of laterally spaced bars at the front of each stall having an upwardly open space between them, the bar at one side of one stall having a connection to the bar at the other side of an adjacent stall, said bars having substantially parallel upper portions and lower portions, the upper portions being less widely spaced than the lower portions and having intermediate portions downwardly divergent from the upper portions to the lower portions of the bars, the upper portions of the bars being defined as those portions with which the terminal portions of the connectors are engaged when an animal wearing the collar is standing and such upper portions being spaced at a distance materially less than the combined length of said connectors, whereby the connectors are slack when an animal wearing the collar stands in the stall, the lower portions of the bars being defined as those portions of the bars with which the terminal portions of the connectors register when an animal wearing the collar lies in the stall, the greater spacing of such lower portions resulting in substantial reduction in the slack of the flexible connectors when an animal wearing the collar lies down in the stall.

References Cited in the file of this patent

UNITED STATES PATENTS

| | | |
|---|---|---|
| 2,294,781 | Ingraham | Sept. 1, 1942 |
| 2,648,308 | Ogden | Aug. 11, 1953 |
| 2,779,312 | Girton | Jan. 29, 1957 |
| 2,815,735 | Collier | Dec. 10, 1957 |

FOREIGN PATENTS

| | | |
|---|---|---|
| 205,104 | Germany | Dec. 18, 1908 |